United States Patent [19]

Rando

[11] Patent Number: 4,544,228

[45] Date of Patent: Oct. 1, 1985

[54] SCANNING METHOD USING A ROTATING PRISM

[75] Inventor: Joseph F. Rando, Los Altos Hills, Calif.

[73] Assignee: Spectra-Physics, Inc., San Jose, Calif.

[21] Appl. No.: 417,926

[22] Filed: Sep. 14, 1982

[51] Int. Cl.⁴ .............................................. G02B 27/17
[52] U.S. Cl. ................................. 350/6.4; 350/3.71
[58] Field of Search ................................ 350/6.4, 3.71

[56] References Cited

U.S. PATENT DOCUMENTS 3,881,802   5/1975   Helava ................................. 350/6.4
4,268,110   5/1981   Ford ................................... 350/6.4

OTHER PUBLICATIONS

Georgallis et al., "Holographic Scanner Polarizer", IBM Tech. Disclosure Bulletin, vol. 23, No. 10, 3/81, pp. 4614–4615.

Primary Examiner—John K. Corbin
Assistant Examiner—Rebecca D. Gass
Attorney, Agent, or Firm—Donald C. Feix

[57] ABSTRACT

A scanning apparatus and method for scanning a beam of light incorporate an optical system in which a rotatable wheel has a plurality of light deflecting facets on the periphery of the wheel. The incoming light beam is reflected by a routing mirror or a routing beam splitter cube onto a front face of a facet as that facet is rotated in line with the routing element. The beam is deflected as it makes its first pass through the facet, and a porro prism redirects the deflected beam back through the rotating facet so that the beam makes two passes through each facet rotating past the routing element. The scanning action is produced by the rotation of the facet in the path of both passes of the beam through the facet. The net result cancels the angular motion of the beam in one direction and adds to the angular motion in the orthogonal direction. Scanning action as produced by one facet is repeated for each facet located on the periphery of the wheel.

11 Claims, 7 Drawing Figures

SCANNING METHOD USING A ROTATING PRISM

This invention relates to scanning apparatus and methods for scanning a beam of light. It relates particularly to apparatus and methods which comprise a rotatable wheel having a plurality of light deflecting facets on the periphery of the wheel.

The present invention scans in a single direction in a repetitive manner as each facet is rotated in line with the incoming beam.

In a specific embodiment multiple prisms are used as the facets so that each prism is rotated only through a small angle and that is the angle through which the scan is most efficient.

U.S. Pat. No. 3,881,802 issued May 6, 1975 to Helava illustrates how a rotable prism can be used with a roof prism reflecting device for causing a beam of light to make two passes through the prism in a way to produce bi-directional scanning in both directions along a line while eliminating deflection in a direction perpendicular to the scanned and retraced line.

The present invention differs from the apparatus and method disclosed in U.S. Pat. No. 3,881,802 in the use of multiple prisms on the periphery of a rotatable wheel to produce a scanning beam which is scanned in a single direction in an arrangement in which each prism is rotated only through a small angle with respect to the incoming beam to be scanned. In the present invention the scanning beam is scanned in a single direction so that a new scanned line is started at the same point and scanned in the same single direction as each prism facet is rotated into a position in which the facet is in line with the incoming beam to be scanned.

The scanning apparatus and method of the present invention thus has particular utility in a laser printer of the kind in which it is necessary to be able to scan from left to right only and then not retrace the scan as the paper advances for the next line to be scanned.

SUMMARY OF THE PRESENT INVENTION

The scanning apparatus and method of the present invention directs a colliminated monochromatic light beam onto a routing mirror or beam splitter cube located to be in line with the periphery of a wheel which has a plurality of light deflecting prisms on the periphery of the wheel.

A drive motor rotates the wheel and facets about an axis of rotation which passes through the center of the wheel. The routing element routs the light beam onto a front face of each facet as the wheel and peripheral facets are rotated past the routing element.

A porro prism is located on the opposite side of the wheel to receive the deflected beam exiting from the back face of a facet and to reflect the beam back through the facet so that the beam makes two passes through each facet rotating past the routing element.

In one embodiment of the invention the routing mirror and porro prism produce a separation of the two passes of the beam through a facet.

In another embodiment of the invention the beam splitter cube and the porro prism are effective to produce overlap of the two passes of the beam through a facet.

In the embodiment of the invention which incorporates a beam splitter cube linearly polarized light is used in conjunction with polarization converting means in a way to obtain maximum utilization of the beam being scanned.

In all embodiments of the invention the angle of entrance of the beam to be scanned into the routing element is a large angle chosen to minimize the variations in reflectivity which are a result of the compound angle of the scanned beam and the normal to the beam splitter surface (or the normal to the routing mirror surface) as the beam exits the scanner. This produces a transmission which is relatively insensitive to scan angle.

A lens focuses the beam after it makes its second pass through a facet, and the present invention is a simple meniscus lens located at a distance away from the prism facet. The lens has curved surfaces which are chosen to minimize aberrations at the image plane. The radii of the lens curve surfaces are chosen so that the beam passes nearly perpendicularly through the lens thickness.

In one embodiment of the present invention a servo control is used with the routing element for moving the routing means in response to variations in movement of an object on which the scanned beam in projected (such as variations in rate of rotation of a drum in a laser printer) to thereby compensate for small variations in movement of the object and to thereby maintain the straightness of the scanned lined on the object.

The present invention provides a method of optimizing the straightness of the scanned line by adjusting the angles between (1) the incoming beam and the wheel axis, (2) the first face of the prism and the wheel axis, and (3) the second face of the prism and the wheel axis. By holding one of the angles constant and adjusting the other two an optimum can be achieved. By continuing to vary the parameters, a second optimum and a third optimum can be achieved. Among them a better optimum can be achieved in which the straightness of a line is improved.

In one specific embodiment of the present invention hologram facets are used in place of prism facets and all of the hologram facets have substantially the same grating spacing. The hologram facets diffract the light beam rather than refracting the light beam like the prism facets.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

DESCRIPTION OF THE PREFERRED EMBODIMENTS

Figure 1:
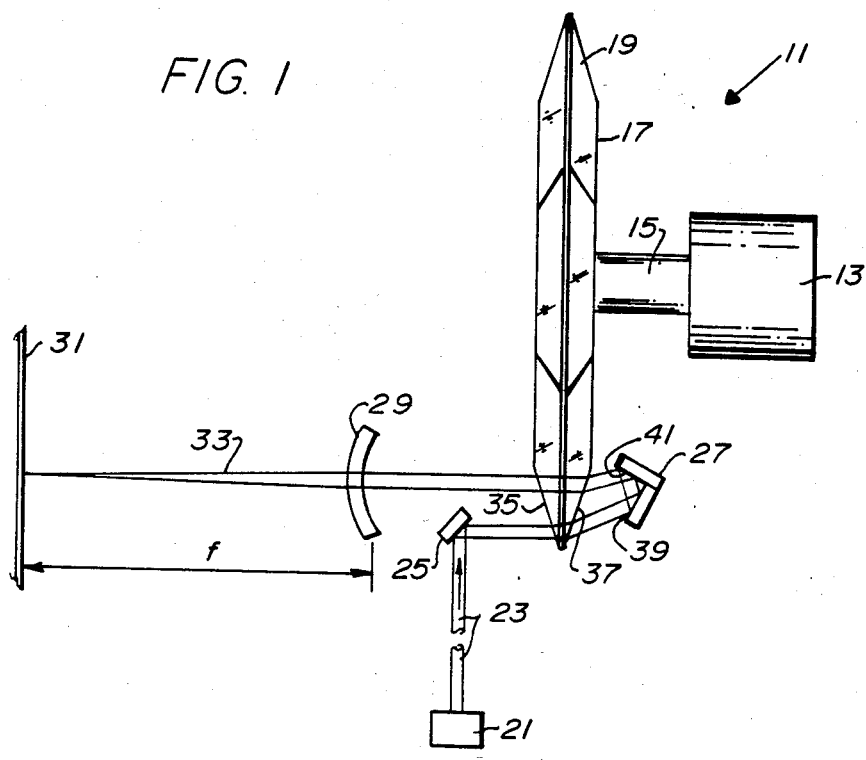
FIG. 1 is a side elevation view of a scanner incorporating a rotating prism arrangement constructed in accordance with one embodiment of the present invention.

A scanner incorporating an optical system constructed in accordance with one embodiment of the invention is illustrated in FIG. 1 and is designated generally by the reference numeral 11.

Figure 5:
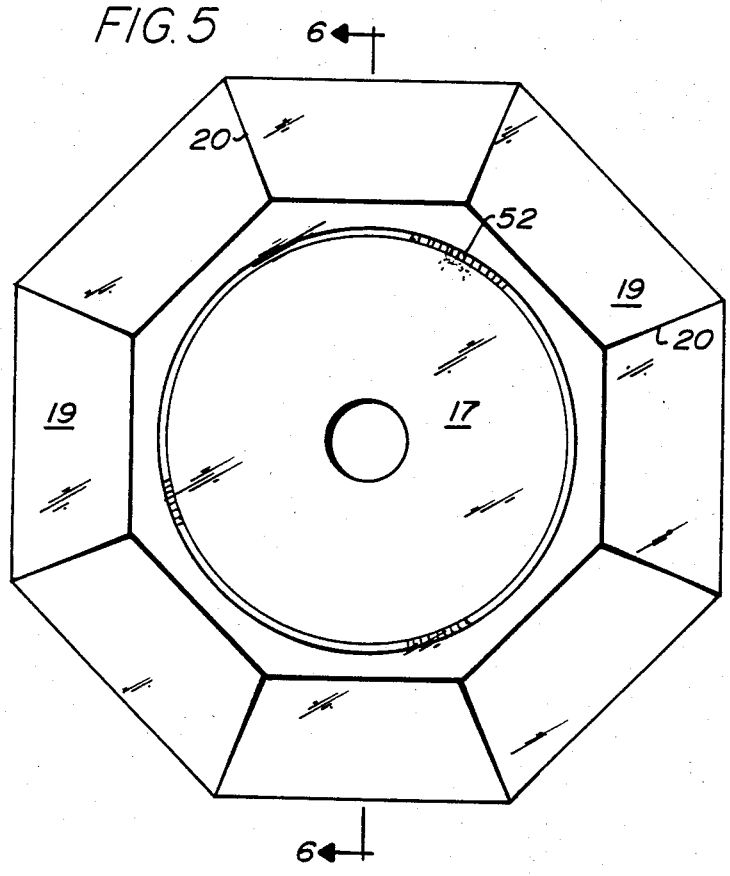
FIG. 5 is an end elevation view of a multifaceted rotatable prism used in the present invention.

The scanning apparatus 11 comprises a motor 13, a shaft 15, a rotatable wheel 17 having plurality of prism facets 19 on the outer periphery of the wheel 17 (see FIGS. 5 and 6), a laser 21 for producing a colliminated beam of light 23, a routing mirror 25, a porro prism 27 comprising two reflecting surfaces disposed at 90° to one another, a focusing lens 29 and a surface 31 on which the scanned beam is projected. The surface 31 is located at the focal distance f from the lens 29.

Figure 2:
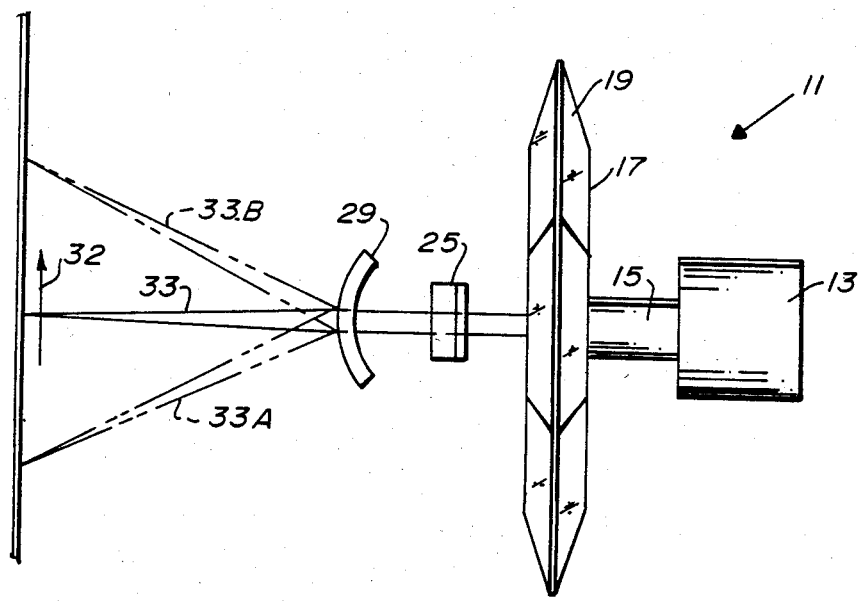
FIG. 2 is a top plan view taken along the line and in the direction indicated by the arrows 2—2 in FIG. 1.

The scanning apparatus 11 produces a scanning beam 33 which is scanned in a single direction (as indicated by the arrow 32 in FIG. 2 between the extremes 33A and 33B as shown by the dashed outlines in FIG. 2.

Figure 3:
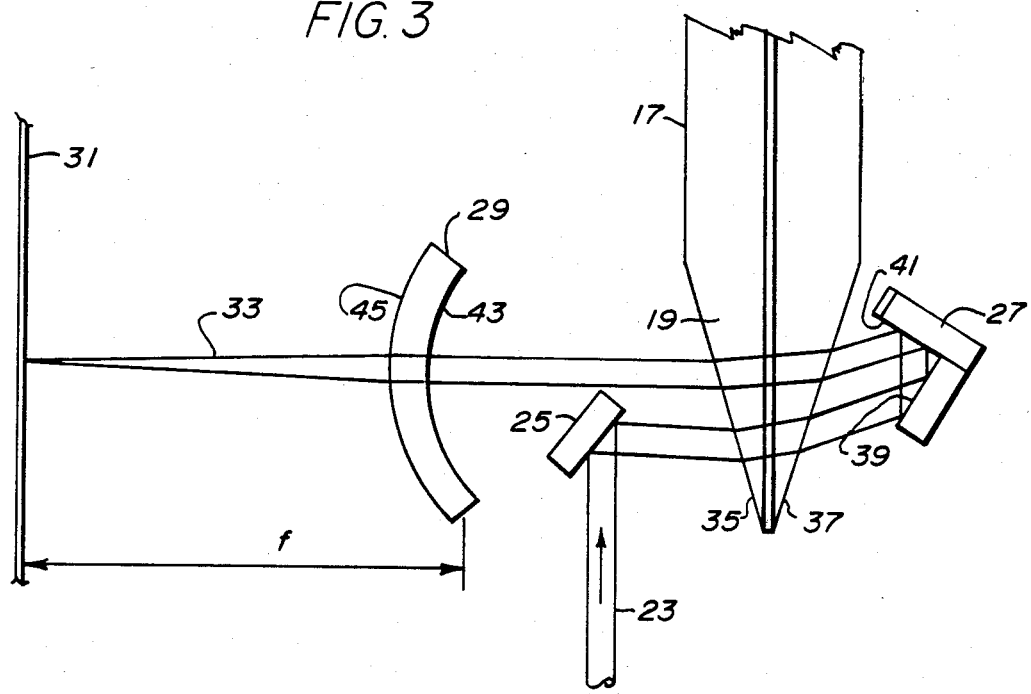
FIG. 3 is a fragmentary enlarged view of a part of FIG. 1 and shows details of the association of a routing mirror, a rotating multifaceted prism, a porro reflecting prism and a singlet lens for focusing the beam to be scanned.

FIG. 3 shows details of the way in which the beam 23 from the laser 21 is reflected and refracted and then focused by the optics of the scanning system to produce the scanning beam 33.

As illustrated in FIG. 3 the beam 23 is reflected by the routing mirror 25 and onto a face 35 of the particular prism facet 19 of the rotating wheel 17 that is in line with the reflected beam 23 at that point in time.

This face 35 refracts the beam as illustrated in FIG. 3, and the beam is further refracted as it exits the prism facet from the face 37.

The beam then impinges on a first face 39 of the porro prism 27 where it is reflected onto the second face 41 of the porro prism.

The second face 41 again reflects the beam and back onto the face 37 of the prism.

The beam is then refracted through the prism and again refracted as it leaves the prism at the face 35.

The beam, as it leaves the face 35 and proceeds toward the lens 29, is substantially parallel in the plane of the drawing to the beam as reflected from the routing mirror 25 onto the face 35.

The lens 29, in the embodiment of the scanning apparatus 11 illustrated in FIGS. 1–3, can be a singlet lens having only two curved surfaces, a first curved surface 43 and a second curved surface 45.

The beam 23 is converted to a focused beam 33 by the lens 29 as illustrated in FIG. 3.

The scanning action is produced by the rotation of the prism facet 19 in the path of both passes of beam 23 through the prism facet 19.

The beam 23 is deflected in a cone configuration on each pass through the prism facet. In the first pass through the prism the beam is deflected in a clockwise direction on the conical surface, and on its return through the same facet the beam is rotating in a counterclockwise direction.

The net result is to cancel the angular motion of the beam in one direction and to add the angular motion in the orthogonal direction.

Thus, looking at FIG. 2, the motion is added in the direction indicated by the arrow 32 and the motion is cancelled in the orthogonal direction (that is, in the direction perpendicular to the plane of the drawing of FIG. 2).

This scanning action as produced by one facet is repeated for each facet 19 located on the periphery of the wheel 17.

There is some interruption of the scanning action at the intersection 20 between adjacent facets. This interruption, in particular embodiment of the invention, amounts to about a 30% interruption.

Figure 4:
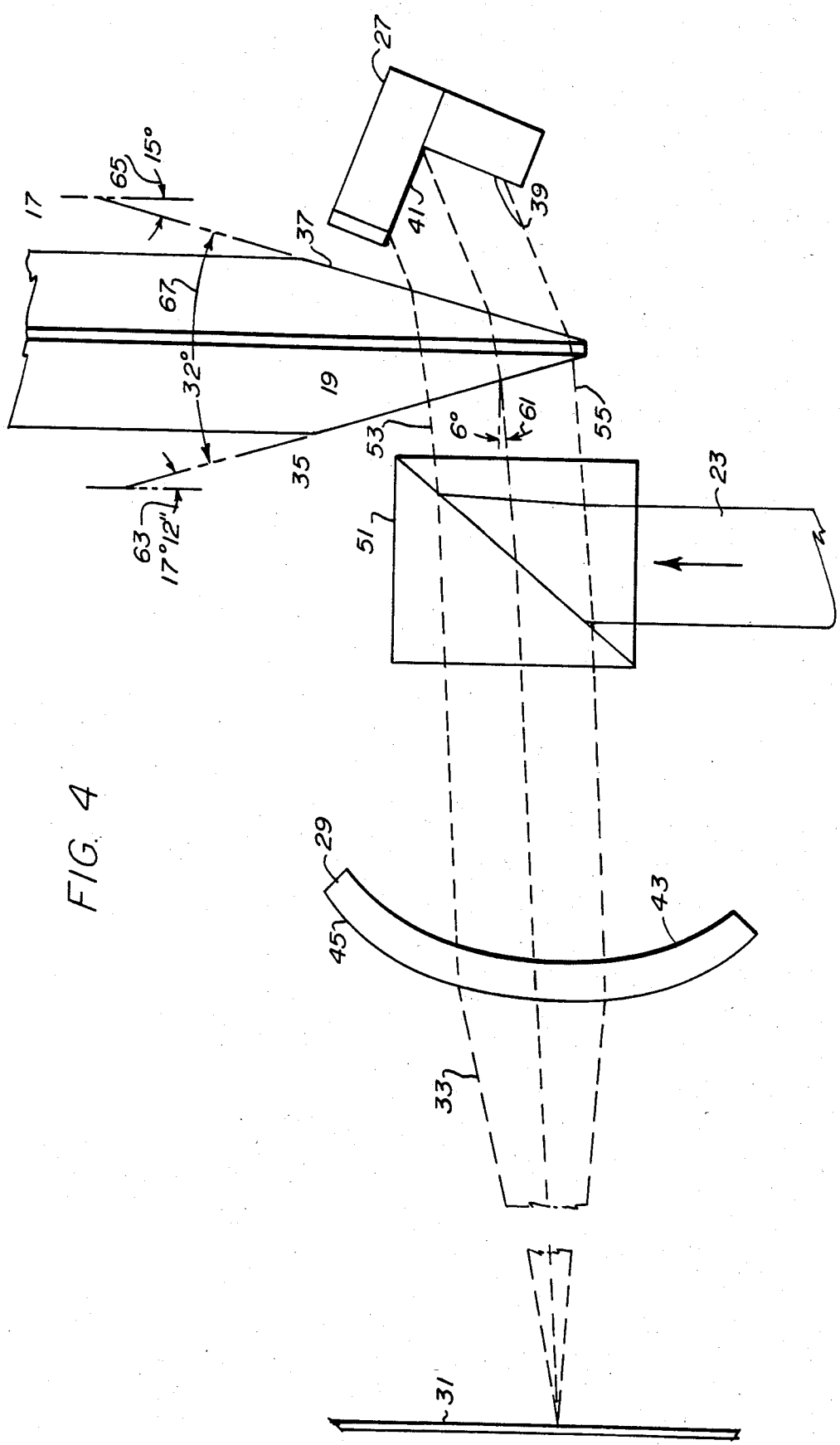
FIG. 4 is a fragmentary, enlarged, view like FIG. 3, but illustrating details of the optics involved in another embodiment of the present invention.

FIG. 4 shows a second embodiment of the present invention.

In the FIG. 4 embodiment each part which corresponds to the same part in FIGS. 1–3 embodiment is indicated by the same reference numeral.

In the FIG. 4 embodiment the diameter of the laser beam 23 uses the same prism space on each pass through the prism. This has the benefit of requiring a smaller prism, and in a particular embodiment of this invention the prism wheel 17 is a plastic molded prism wheel. By using a smaller prism the fabrication of the prism is simplified. In some applications the prism facets may be Fresnel prisms.

To summarize the operation of the embodiment shown in FIG. 4, the collimated laser beam 23 is reflected by a beam splitter cube 51 instead of being reflected by a routing mirror 25 as in the FIG. 3 embodiment.

Figure 6:
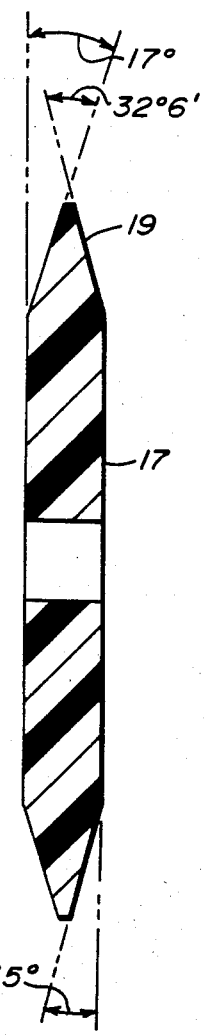
FIG. 6 is an elevation view in cross section taken along the line and in the direction indicated by the arrows 6—6 in FIG. 5.

The upper and lower boundaries of the beam 23 as reflected are indicated by reference numerals 53 and 55 in FIG. 6.

On the first pass through the prism facet 19 the portion of the beam which is reflected by the beam splitter cube 51 is double refracted, and the beam passing through the prism from left to right occupies the same volume of the prism as the beam which passes through the prism from right to left after being reflected by the porror prism 27.

This minimizes the volume of the prism required.

As illustrated in the FIG. 6 embodiment the beam leaving the surface 35 of the prism facet 19 is transmitted (except for the scanning action) onto substantially the same part of the beam splitter 51 as the part of the beam splitter occupied by the initial beam 23 from the laser.

The useful scan in this case is the amount of light in the beam as transmitted through the beam splitter 51.

To obtain the maximum utilization of the beam 23, it is preferred that the beam be polarized and that the beam splitter 51 have the capability of transmitting or reflecting the beam depending upon its polarization. A polarization converting element (not shown) is present in the optical path between the beam splitter and the porro prism. The element converts p polarization to s polarization. This element may be a quarterwave plate. It is also possible to convert the p polarization to an s polarization by designing the coatings on the porro prism 27 to rotate the polarization.

With the use of polarization separation it is possible to focus all of the linearly polarized beam 23 onto the screen 31 of the scanner.

In the FIG. 4 embodiment the beam as it exits the face 35 of the prism facet 19 has a compound angle because of the scanning with respect to the normal of the beam splitter. That is, the beam has an angle in the plane of the paper which is controller by the various refractions (by the scanning), but the beam also has an angle with respect to the beam splitter 51 which is at 90° with respect to the plane of the paper. This is the scan angle.

As illustrated in FIG. 4 the beam 23 strikes the beam splitter 51 at a 45° angle. This 45° angle is chosen to minimize the variations in reflectivity which are a result of the compound angle of the scanned beam and the normal to the beam splitter surface as the beam exits the scanner.

To illustrate this last point, if the beam 23 from the laser were going into the beam splitter 51 at an angle perpendicular to the plane of the drawing of FIG. 4 (instead of going into the beam splitter 51 on a line within the plane of the drawing of FIG. 4 as illustrated), and if the beam were then directed by the 45° beam splitter 51 (or by the routing mirror 25 of FIG. 1) through the prism to the porro prism and to the line 29, the scan angle would add and subtract to the 45° angle changing the angle of incidence from 35° to 55°. This large change in angle would result in a great change in reflectivity.

In all operations it is desirable to have a straight scan line. The prism angle and the angles between the beam and the prism and the motor axis in the prism can be chosen to minimize the waviness of the line. Computer studies show that an optimum exists for any prism angle.

The most sensitive parameter is the axis of the motor relative to the incoming beam. One preferred embodiment (as illustrated in FIG. 4) shows the beam (as reflected by beam splitter cube 51) entering the motor axis at an angle 61 (see FIG. 4) of 6° and with the angle 63 between the first face and the normal to the wheel axis being approximately 17° and with the angle 65 between the second face of the prism and the normal to the motor axis being approximately 15°. This results in an included angle 67 of 32° for the prism 19. The resulting scan line is very straight over plus or minus 10° of scan angle for an eight sided prism wheel.

For other prism angles there is an optimum between the parameter of beam entrance angle, motor wheel axis and the two prism faces.

With this relationship, and with the physical arrangement of the optical components shown in FIG. 6, it is possible to optimize the straightness of the scan line by making small adjustments to the beam entrance angle, the angle between the motor axis and the first face, the angle between the motor axis and the second face of the prism, and the angle between the motor axis and the beam entering the prism.

To achieve the optimum conditions for line straightness, one picks a prism included angle which gives the desired scan and systematically adjusts the incoming beam angle and for each angle varies the other angles sequentially to achieve the straightness. The other angles are the angle between the first prism face and the beam coming in, the second face and the beam coming in, and the wheel axis and the beam coming in.

Thus, to achieve the straightness of the line, one can adjust the parameters of the preferred embodiment to achieve an optimum. The parameters to be adjusted are the angle between the incoming beam and the wheel axis and the angle between the first face of the prism and the wheel axis and the angle between the second face and the wheel axis. By choosing one and varying the other two, an optimum can be achieved. By continuing to vary the parameters, a second optimum and a third optimum can be achieved. Among them, a better optimum can be achieved in which the straightness of the line is improved.

In actual operation lines as straight as a few hundredths of an arc second over plus or minus 10° have been obtained.

The scanning system of the present invention has utility in a number of applications.

For example, the scanner is useful in laser printing. It is also useful in scanning documents.

In laser printing it is often necessary to track the motion of the drum to keep the line on its true location.

One of the applications of this device is in writing on a selenium coated drum of a photocopier machine. In this system, the laser scans the line and the beam is turned off and on in sequence to produce characters on the drum. One of the features of this invention is that the beam can be easily controlled to follow small variations of the drum that may be caused by vibration. The beam splitter shown in the preferred embodiment 51 in FIG. 6 can be tilted by a galvonometer to cause the beam to walk up and down a small amount of distance on the drum to take care of small variations in the velocity of the drum.

The present invention also provides advantages in obtaining linearity. In many scanners the beam is moved by a rotating mirror. The beam angle is twice the mirror angle. This results in a non-linearity between the motion of the beam and the motion of the wheel. In the system described here, because of the prism scanning technique there is greater linearity between the rotation of the wheel and the movement of the beam on the scan line. This non-linearity is at least half that experienced in the conventional rotating mirror scanner.

The linearity can be further improved by using special encoding marks 52 (see FIG. 5) on the prism wheel. Each mark is read with an auxiliary optical system and indicates an equal scan increment.

The advantages of this type of scanning are many.

One advantage is the insensitivity of the beam position with wheel wobble. Because the prism is rotating at a high speed, wobble in the prism occurs due to imbalance. This wobble does not affect the beam position going through onto the scan line because of the prism properties.

A second advantage of this system is that because the beam appears to come from a point beyond the wheel, a simple lens can be used which serves to keep the cost of the system down.

Another advantage is that the wavelength dependence of the scan position is much less than encountered in holographic scanners which might also be used in this application. In the holographic scanner, the beam position is a direct function of the wavelength. In the scanner of the present invention the beam position is a function of the refraction which depends upon the index of refraction which is a slower function of wavelength than defraction is.

Figure 7:
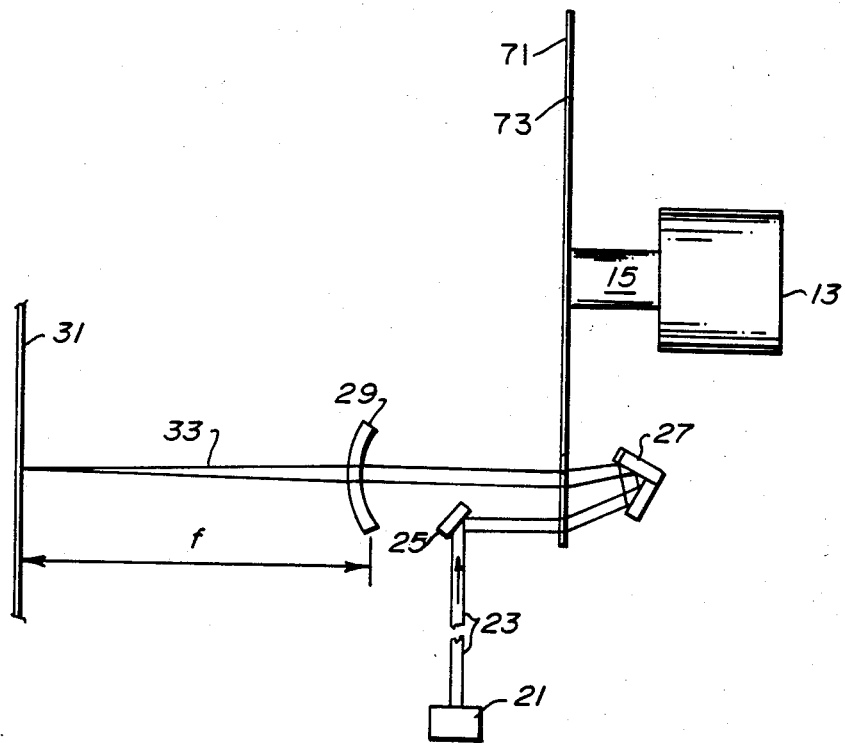
FIG. 7 is an elevation view like FIG. 1 but showing a hologram in place of the prism wheel.

In another embodiment of the invention shown in FIG. 7, the prism facets 19 of the wheel 17 are replaced by a hologram 73 of uniform diffraction angle. The hologram 73 deflects the beam just like the prism except that the hologram uses diffraction instead of refraction.

The hologram 73 comprises a number of facets 71 about the periphery of the hologram 73 and which are of uniform grating spacing. The hologram facets 71 function in a similar fashion as the prism facets 19 except for the fact that the hologram facets diffract the light rather than refract the light, as noted above.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A scanning apparatus for repeatedly scanning a beam of light in a single same direction and from the same starting point, said apparatus comprising, light beam means for producing a collimated monochromatic light beam, a prism wheel having a plurality of light deflecting prism facets on the periphery of the wheel and wherein all of the prism facets have substantially the same prism angle, rotating means for rotating the wheel and the prism facets about an axis of rotation passing through the center of the wheel, routing means for routing the light beam onto a front face of each prism facet as the wheel and the peripheral prism facets are rotated past the routing means, and porro prism means for receiving the deflected beam exiting the back face of the prism facet and for reflecting the beam back through the prism facet so that the beam makes two passes through each prism facet rotating past the routing means and wherein the plurality of prism facets having the same prism angle are effective to produce a plurality of scanned beams each starting from the same starting point and each scanned in the same, single direction without retracing.

2. The invention defined in claim 1 wherein the routing means comprise a routing mirror effective to produce separation of the two passes of the beam through a facet.

3. The invention defined in claim 1 wherein the routing means comprise a beam splitter cube effective to produce overlap of the two passes of the beam through a facet.

4. The invention defined in claim 3 including polarization means for producing linearly polarized light at the inlet to the routing means and converting means for converting the polarization of the beam to an opposite polarization prior to the second pass of the beam through the beam splitter cube.

5. The invention defined in claim 1 wherein the wheel and prism facets are a one piece plastic molded structure.

6. The invention defined in claim 1 including a lens for focusing the beam after it makes its second pass through a facet.

7. The invention defined in claim 7 wherein the lens is a single meniscus lens located a distance away from the rotating prism facets and having curved surfaces chosen to minimize aberrations at the image plane.

8. The invention defined in claim 7 wherein the radii of the curved surfaces are chosen so that the beam passes nearby perpendicularly through the lens thickness.

9. The invention defined in claim 1 including servo control means for moving the routing means with respect to the direction of the incoming light beam in response to variations in the movement of an object on which the scanned beam is projected to thereby compensate for small variations in the movement of the object and to maintain the straightness of the scanned line on the object.

10. The invention defined in claim 1 including inlet means for directing the incoming beam into the routing means in a direction substantially perpendicular to the axis of rotation of the wheel and substantially in a plane containing the axis of rotation of the wheel so that the beam enters the routing means at a large entrance angle and at an entrance angle which minimizes the effect of the angle between the scanning beam and the normal to the routing means to produce a transmission relatively insensitive to scan angle.

11. A method of optimizing the straightness of a scanned line in an optical scanner of the kind having a rotating prism and routing means and reflecting means for causing a collimated monochromatic light beam to make two passes through the rotating prism and to produce the scanned line, said method comprising,
(1) separately adjusting two of the angles between
 (a) the incoming beam and the wheel axis,
 (b) the first face of the prism and the wheel axis, and
 (c) the second face of the prism and the wheel axis
while holding one of the angles constant to achieve an optimum for each sequence of adjustment and to produce first, second and third optimums and
(2) then adjusting the angles to produce the better optimum of the three.

* * * * *